US010078249B2

United States Patent
Lee et al.

(10) Patent No.: US 10,078,249 B2
(45) Date of Patent: Sep. 18, 2018

(54) LIQUID CRYSTAL DISPLAY

(71) Applicant: Samsung Display Co., Ltd., Yongin-si, Gyeonggi-do (KR)

(72) Inventors: Sang-Je Lee, Asan (KR); Deok Ho Kang, Seoul (KR); Jeong Man Son, Suwon-si (KR); Dong Hee Ye, Daegu (KR); Jin Young Lee, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 23 days.

(21) Appl. No.: 15/065,699

(22) Filed: Mar. 9, 2016

(65) Prior Publication Data

US 2016/0377937 A1  Dec. 29, 2016

(30) Foreign Application Priority Data

Jun. 29, 2015 (KR) .......................... 10-2015-0092482

(51) Int. Cl.
| | | |
|---|---|---|
| *G02F 1/1362* | (2006.01) | |
| *G02F 1/1343* | (2006.01) | |
| *G02F 1/1337* | (2006.01) | |
| *G02F 1/1335* | (2006.01) | |

(52) U.S. Cl.
CPC .. *G02F 1/134309* (2013.01); *G02F 1/133707* (2013.01); *G02F 2001/133531* (2013.01); *G02F 2001/133776* (2013.01); *G02F 2001/134345* (2013.01)

(58) Field of Classification Search
CPC ............ G02F 1/1337; G02F 1/133707; G02F 2001/133531; G02F 1/134309; G02F 1/133528
See application file for complete search history.

(56) References Cited

U.S. PATENT DOCUMENTS

| | | | | |
|---|---|---|---|---|
| 2003/0193625 A1* | 10/2003 | Yoshida | ............ | G02F 1/134336 349/43 |
| 2008/0129670 A1* | 6/2008 | Ma | ..................... | G02F 1/136213 345/88 |
| 2009/0059148 A1* | 3/2009 | Hanaoka | ........... | G02F 1/133753 349/124 |

(Continued)

FOREIGN PATENT DOCUMENTS

| | | |
|---|---|---|
| KR | 10-2003-0038075 A | 5/2003 |
| KR | 10-0670061 | 1/2007 |

(Continued)

*Primary Examiner* — Michael Caley
*Assistant Examiner* — Jonathan Y Jung
(74) *Attorney, Agent, or Firm* — Innovation Counsel, LLP

(57) ABSTRACT

An exemplary embodiment of the present disclosure provides a liquid crystal display including: a first substrate; a first polarizer disposed above or below the first substrate and having a first polarization axis; a passivation layer disposed on a data line; a unit pixel electrode that is disposed on the data line and includes a horizontal stem and a vertical stem crossing each other and a plurality of minute branch electrodes extending from the stems; a protrusion portion disposed on the passivation layer, surrounding an edge of the unit pixel electrode, and extending in a direction that forms an acute angle with the first polarization axis; and a liquid crystal layer formed on the first substrate and including liquid crystal molecules.

14 Claims, 12 Drawing Sheets

(56) References Cited

U.S. PATENT DOCUMENTS

| | | | | |
|---|---|---|---|---|
| 2011/0102721 A1* | 5/2011 | Enomoto | ......... | G02F 1/133536 |
| | | | | 349/137 |
| 2011/0164206 A1* | 7/2011 | Fan | .................. | G02F 1/133753 |
| | | | | 349/96 |
| 2014/0226100 A1* | 8/2014 | Kim | ................. | G02F 1/134363 |
| | | | | 349/43 |
| 2016/0328074 A1* | 11/2016 | Peng | ....................... | G06F 3/047 |

FOREIGN PATENT DOCUMENTS

| | | |
|---|---|---|
| KR | 10-2007-0070722 A | 7/2007 |
| KR | 10-0812474 | 3/2008 |
| KR | 10-2009-0027474 A | 3/2009 |
| KR | 10-2010-0073694 A | 7/2010 |
| KR | 10-2011-0126171 A | 11/2011 |
| KR | 10-2014-0061611 A | 5/2014 |

\* cited by examiner

LIQUID CRYSTAL DISPLAY

CROSS-REFERENCE TO RELATED APPLICATION

This application claims priority to and the benefit of Korean Patent Application No. 10-2015-0092482 filed in the Korean Intellectual Property Office on Jun. 29, 2015, the entire contents of which are incorporated herein by reference.

BACKGROUND (a) Field

The embodiment of the present disclosure relates to a liquid crystal display. More particularly, the embodiment of the present disclosure relates to a liquid crystal display with improved transmittance.

(b) Description of the Related Art

Liquid crystal displays (LCDs) are one of the most widely used flat panel displays, and an LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field in the LC layer that determines the orientations of LC molecules therein in order to adjust polarization of incident light thereto.

The two sheets of display panels configuring the LCD may include a thin film transistor array panel and an opposing display panel. A gate line transmitting a gate signal and a data line transmitting a data signal are formed to cross each other, and a thin film transistor connected to the gate line and the data line, a pixel electrode connected to the thin film transistor, and the like may be formed on the thin film transistor array panel. A light blocking member, a color filter, a common electrode, and the like may be formed on the opposing display panel. In some cases, the light blocking member, the color filter, and the common electrode may be formed on the thin film transistor array panel.

Recently, LCDs have been becoming wider, and curved displays are developed to enhance viewer immersion.

The curved liquid crystal display may be realized by forming components on two display panels, attaching the display panels together to prepare a flat-panel liquid crystal display, and then bending it to have a predetermined curvature. In this case, the two display panels may become misaligned from each other, causing the generation of texture and reduction of transmittance.

The above information disclosed in this Background section is only to enhance the understanding of the background of the disclosure and therefore it may contain information that does not form the prior art that is already known in this country to a person of ordinary skill in the art.

SUMMARY

The present disclosure has been made in an effort to provide a liquid crystal display with improved transmittance.

An exemplary embodiment of the present disclosure provides a liquid crystal display including: a first substrate; a first polarizer disposed above or below the first substrate and having a first polarization axis; a passivation layer disposed on a data line; a unit pixel electrode that is disposed on the data line and includes a horizontal stem and a vertical stem crossing each other, and a plurality of minute branch electrodes extending from the stems; a protrusion portion disposed on the passivation layer, surrounding an edge of the unit pixel electrode and extending in a direction that forms an acute angle with the first polarization axis; and a liquid crystal layer formed on the first substrate and including liquid crystal molecules.

The protrusion portion may surround equal to or more than about 80% of an inner area including a center portion of the unit pixel electrode in a plane view.

The protrusion portion may be formed in a rhomboid shape that includes the horizontal stem and the vertical stem as two diagonals.

The liquid crystal molecules on the protrusion portion may have a pretilt in a direction perpendicular to a surface of the protrusion portion.

The direction of the pretilt of the liquid crystal molecules may be parallel to a direction in which the minute branch electrodes extend.

The liquid crystal display may further include a common electrode formed in a plate shape.

The protrusion portion may include an organic material.

The liquid crystal display may further include a subpixel electrode including the unit pixel electrode; a thin film transistor connected to the subpixel electrode; a gate line that includes a first gate portion extending along a right side of the subpixel electrode and a second gate portion bent from the first gate portion and connected to the thin film transistor; and a data line that includes a first data portion extending along a left side of the subpixel electrode and a second data portion bent from the first data portion and extending along a lower side of the subpixel electrode.

The first gate portion may be connected to the second gate portion of a pixel which is disposed in one right column and one upper row, and the second data portion may be connected to the first data portion of a pixel which is disposed in one right column and one lower row.

The liquid crystal display may be bent along the first direction to have a predetermined curvature to form a curved display.

The horizontal stem may be formed in the first direction, and the vertical stem may be formed in a direction perpendicular to the horizontal stem.

The protrusion portion may be formed at an angle of about 45° with the first direction, and the protrusion portion may be a square.

The liquid crystal display may further include a second substrate facing the first substrate; and a second polarizer formed above or below the second substrate and having a second polarization axis, wherein the first polarization axis may be parallel or perpendicular to the first direction, and the second polarization axis may be parallel or perpendicular to the first polarization axis.

The liquid crystal display may further include a common electrode formed on one side of the second substrate in a plate shape.

The protrusion portion may be formed to include an organic material.

The liquid crystal display may further include a subpixel electrode including the unit pixel electrode; a thin film transistor connected to the subpixel electrode; a gate line that includes a first gate portion extending along a right side of the subpixel electrode and a second gate portion bent from the first gate portion and connected to the thin film transistor; and a data line that includes a first data portion extending along a left side of the subpixel electrode and a second data portion bent from the first data portion and extending along a lower side of the subpixel electrode.

The first gate portion may be connected to the second gate portion of a pixel which is disposed in one right column and one upper row, and the second data portion may be connected to the first data portion of a pixel which is disposed in one right column and one lower row.

The liquid crystal display may be bent along the first direction to have a predetermined curvature to form a curved display.

The liquid crystal display according to the exemplary embodiment of the present disclosure has the following advantage.

The liquid crystal display may improve transmittance by forming a protrusion on a pixel electrode in a different direction from a polarization axis.

Further, the liquid crystal display may improve transmittance by not forming a pattern on a common electrode.

DETAILED DESCRIPTION OF THE EMBODIMENTS

Figure 1:
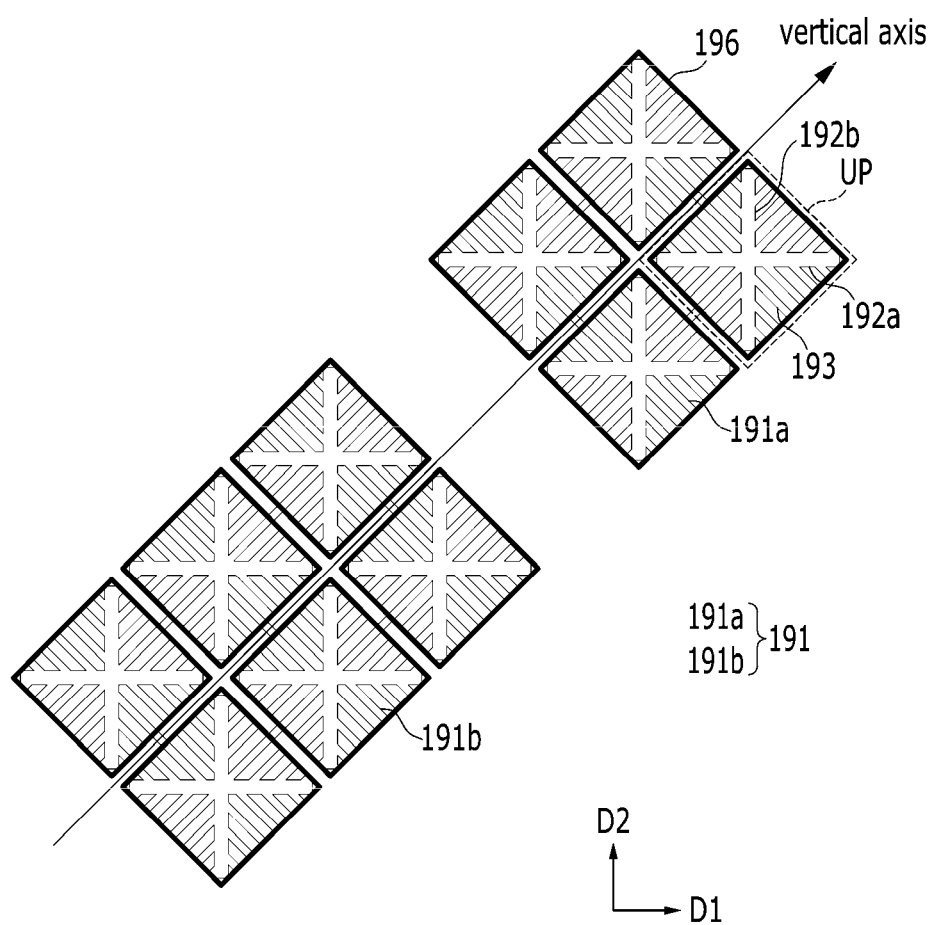
FIG. 1 illustrates a schematic diagram of a pixel electrode and a protrusion portion that can be applied to a liquid crystal display according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, shapes and advantages of a pixel electrode 191 and a protrusion portion 196 of a liquid crystal display according to an exemplary embodiment of the present disclosure will be described in detail with reference to FIGS. 1 to 3.

FIG. 1 illustrates a schematic diagram of a pixel electrode 191 and a protrusion portion 196 that can be applied to a liquid crystal display according to an exemplary embodiment of the present disclosure. FIG. 2 illustrates a schematic diagram in which a unit pixel electrode UP of a pixel electrode 191 of FIG. 1 is enlarged, the enlarged unit pixel electrode UP is surrounded by a protrusion portion 196, and liquid crystal molecules 31 are disposed on the protrusion portion; and FIG. 3A and FIG. 3B illustrates a cross-sectional view taken along line III-III of FIG. 2. Exemplary embodiments in which the pixel electrode 191 and the protrusion portion 196 of FIG. 1 are substantially applied to the liquid crystal display will be described later with reference to FIGS. 4 to 7.

The liquid crystal display according to the exemplary embodiment of the present disclosure includes a plurality of pixel electrodes 191, and one pixel electrode 191 may include a first subpixel electrode 191a and a second subpixel electrode 191b. The pixel electrode 191 may include a plurality of unit pixel electrodes UP. In the present exemplary embodiment, the first subpixel electrode 191a may include 4 unit pixel electrodes UP, and the second subpixel electrode 191b may include 6 unit pixel electrodes UP.

When a horizontal direction of the liquid crystal display and a polarization axis direction of a polarizer formed in the liquid crystal display are referred to as a first direction D1, a vertical axis of the pixel electrode 191 is substantially obliquely formed with respect to the first direction D1, and it may be formed at an angel of about 45° with the first direction D1.

Figure 2:
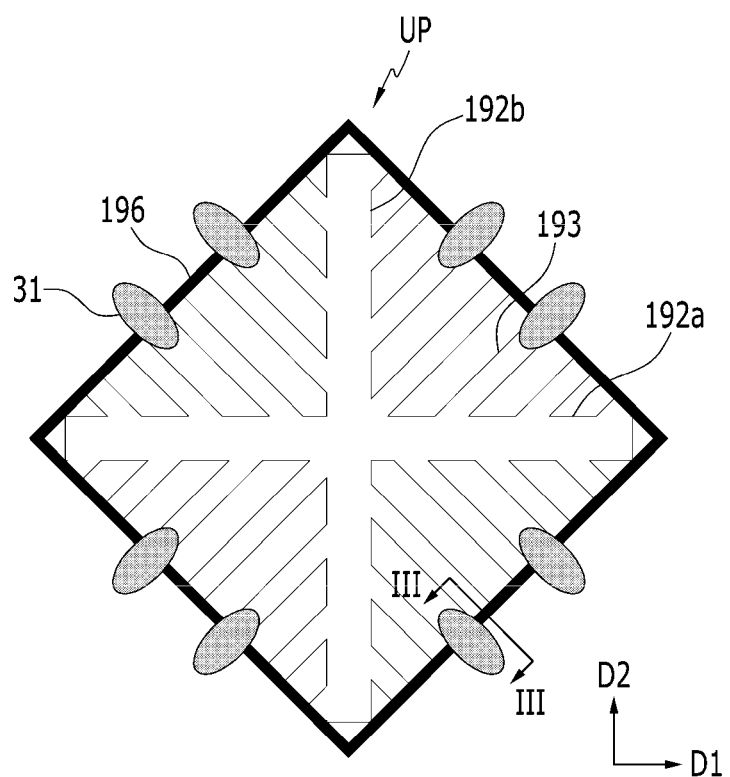
FIG. 2 illustrates a schematic diagram in which a unit pixel electrode portion of a pixel electrode of FIG. 1 is enlarged.
Figure 3A:
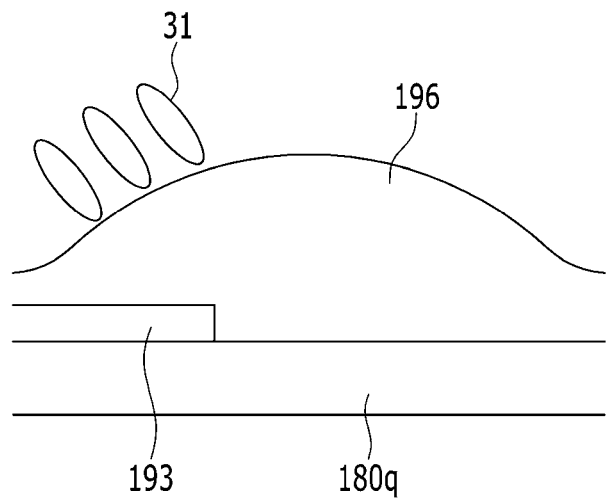
FIG. 3A and FIG. 3B illustrates a cross-sectional view taken along line III-III of FIG. 2.
Figure 3B:
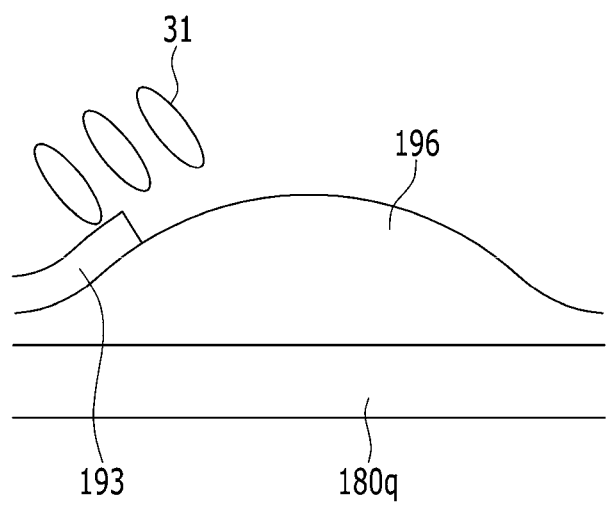

Referring to FIG. 2, each of the plurality of unit pixel electrodes UP forming the pixel electrode 191 includes a pair of horizontal and vertical stems 192a and 192b and a plurality of minute branch electrodes 193 obliquely extending from the stems. A position at which the horizontal stem 192a and the vertical stem 192b intersect may be substantially disposed at the center of the unit pixel electrode UP.

A length of the horizontal stem 192a may be equal to that of the vertical stem 192b, a direction of the horizontal stem 192a is parallel to the first direction D1, and the vertical stem 192b crosses the horizontal stem 192a. That is, the vertical stem 192b is parallel to the second direction D2 which is perpendicular to the first direction D1.

The minute branch electrodes 193 extend from the horizontal stem 192a and the vertical stem 192b, minute branch electrodes disposed at upper left sides of the horizontal stem 192a and the vertical stem 192b obliquely extend in an upper left direction, and minute branch electrodes disposed at upper right sides thereof obliquely extend in an upper right direction. Similarly, minute branch electrodes disposed at lower left sides of the horizontal stem 192a and the vertical stem 192b obliquely extend in a lower left direction, and minute branch electrodes disposed at lower right sides thereof obliquely extend in a lower right direction The minute branch electrodes 193 on the upper side and the lower side of the horizontal stem 192a are formed asymmetrically with respect to the horizontal stem 192a. The minute branch electrodes 193 on the left side and the right side of the vertical stem 192b are formed asymmetrically with respect to the vertical stem 192b The minute branch electrodes 193 facing each other with respect to the horizontal stem 192a or the vertical stem 192b are disposed to deviate from each other.

The protrusion portion 196 is formed on each unit pixel electrode UP to surround most of a transmissive area including most of the areas in which the minute branch electrodes 193 of each unit pixel electrode UP are formed in a plane view, and all sides of the protrusion portion 196 are formed in a direction that forms an acute angle with the polarization axis. The protrusion portion 196 may be formed above the pixel electrode 196 on the pixel electrode 196 as disclosed in FIG. 3A. However, the protrusion portion 196 may be formed below the pixel electrode 196 on the pixel electrode 196 as disclosed in FIG. 3B. For example, the protrusion portion 196 may be formed to surround an area equal to or more than about 80% of an inner area including a center portion of each unit pixel electrode UP. The protrusion portion 196 may be formed in a rhomboid shape that includes the horizontal stem 192a and the vertical stem 192b as two diagonals, and particularly, since the horizontal stem 192a and the vertical stem 192b have the same length in the present exemplary embodiment, the protrusion portion 196 may be formed in a rhombus shape in which the lengths of the two diagonals are the same. That is, since the horizontal stem 192a is formed in the first direction D1, the protrusion portion 196 may be formed at an angle of about 45° to the right or left based on the first direction D1.

The protrusion portion 196 is formed to surround a circumference of one unit pixel electrode UP, and the protrusion portion 196 may partially overlap the stems 192a and 192b of the unit pixel electrode UP or the end portions of the minute branch electrodes 193 of the unit pixel electrode UP, and alternatively, it may be disposed at the outside thereof without overlapping the stems 192a and 192b or the end portions of the minute branch electrodes 193. The protrusion portion 196 may include an organic material.

As such, when protrusion portion 196 is formed at the circumference of the pixel electrode 191 and the liquid crystal molecules 31 are on the protrusion portion 196, the liquid crystal molecules 31 on the protrusion portion 196 may have a pretilt angle. Referring to FIGS. 2 and 3, the liquid crystal molecules 31 on the protrusion portion 196 may have a pretilt to be easily tilted to a direction perpendicular to an extension direction of the protrusion portion 196 when a voltage is applied to the liquid crystal molecules 31, thereby a long axis of the liquid crystal molecules 31 maybe perpendicular to a direction in which the protrusion portion 196 extends. For example, the liquid crystal molecules 31 on the protrusion portion 196 may have a pretilt that is tilted at an angle of about 45° to the right or left with respect to the first direction D1 in a state in which the liquid crystal molecules 31 are perpendicular to a surface of the pixel electrode 191. The direction of the pretilt and the direction in which the minute branch electrodes 193 extend may be substantially identical.

As such, the liquid crystal molecules 31 having the pretilt may be tilted to the direction of the pretilt when an electric field is generated by the pixel electrode 191.

In this case, since the tilt direction of the liquid crystal molecules 31 is different from the polarization axis (the first direction or the second direction), luminance of the liquid crystal display increases more than when the tilt direction of the liquid crystal molecules 31 is identical to the polarization axis, thereby minimizing loss of transmittance.

While this disclosure has been described in connection with what is presently considered to be practical exemplary embodiments, it is to be understood that the disclosure is not limited to the disclosed embodiments. The direction in which the protrusion portion 196 is formed is not necessarily formed at an angle of about 45° with respect to the first direction D1, and if it is formed so as not to be parallel to the polarization axis direction, advantages may be obtained. Unlike the present exemplary embodiment, the minute branch electrodes 193 may be formed symmetrically to the left and right with respect to the horizontal stem 192a or the vertical stem 192b, and the protrusion portion 196 may be formed to surround all of the circumferences of two or more unit pixel electrodes UP. The directions of the first and second polarization axes may be parallel or perpendicular to the first direction D1 or the second direction D2, and the second subpixel electrode 191b may be omitted.

Exemplary embodiments in which the pixel electrode 191 and the protrusion portion 196 of FIG. 1 are substantially applied to the liquid crystal display will now be described in detail with reference to FIGS. 4 to 7.

Figure 4:
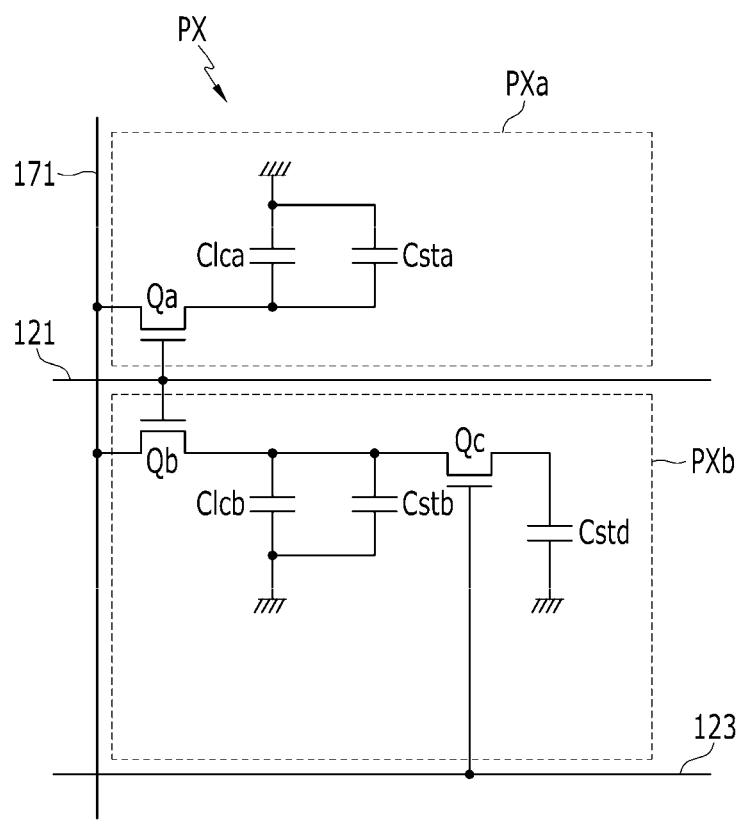
FIG. 4 illustrates a circuit diagram of one pixel of a liquid crystal display according to an exemplary embodiment of the present disclosure.
Figure 5:
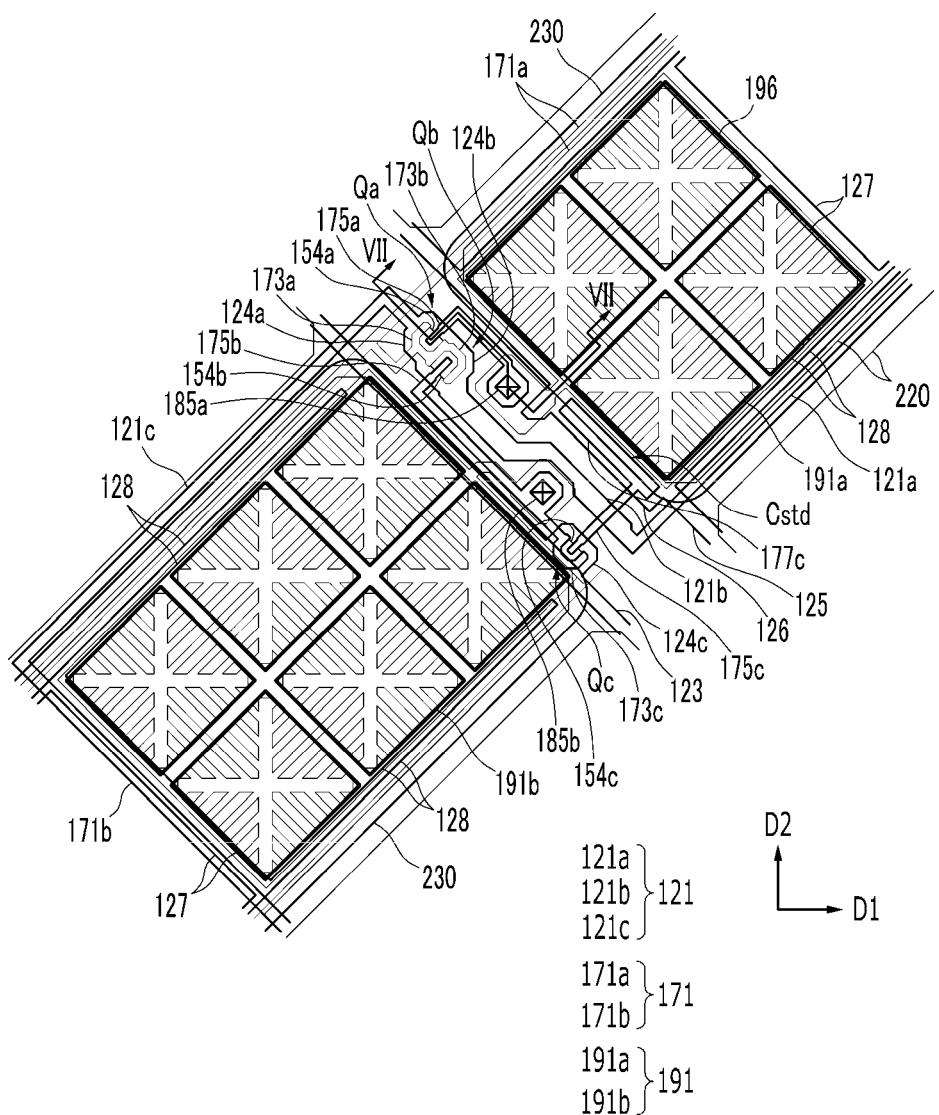
FIG. 5 illustrates a top plan view of one pixel of a liquid crystal display according to an exemplary embodiment of the present disclosure.
Figure 6:
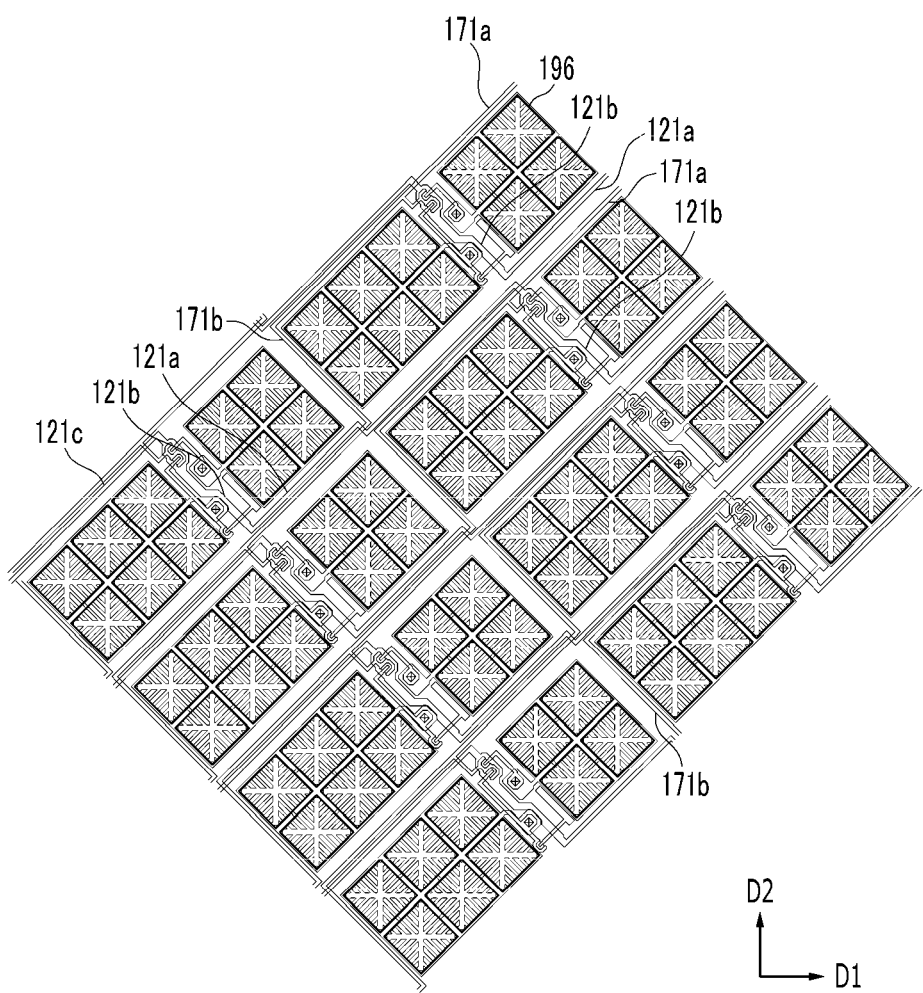
FIG. 6 illustrates a connection structure of gate lines and data lines of a plurality of pixels of a liquid crystal display according to an exemplary embodiment of the present disclosure.
Figure 7:
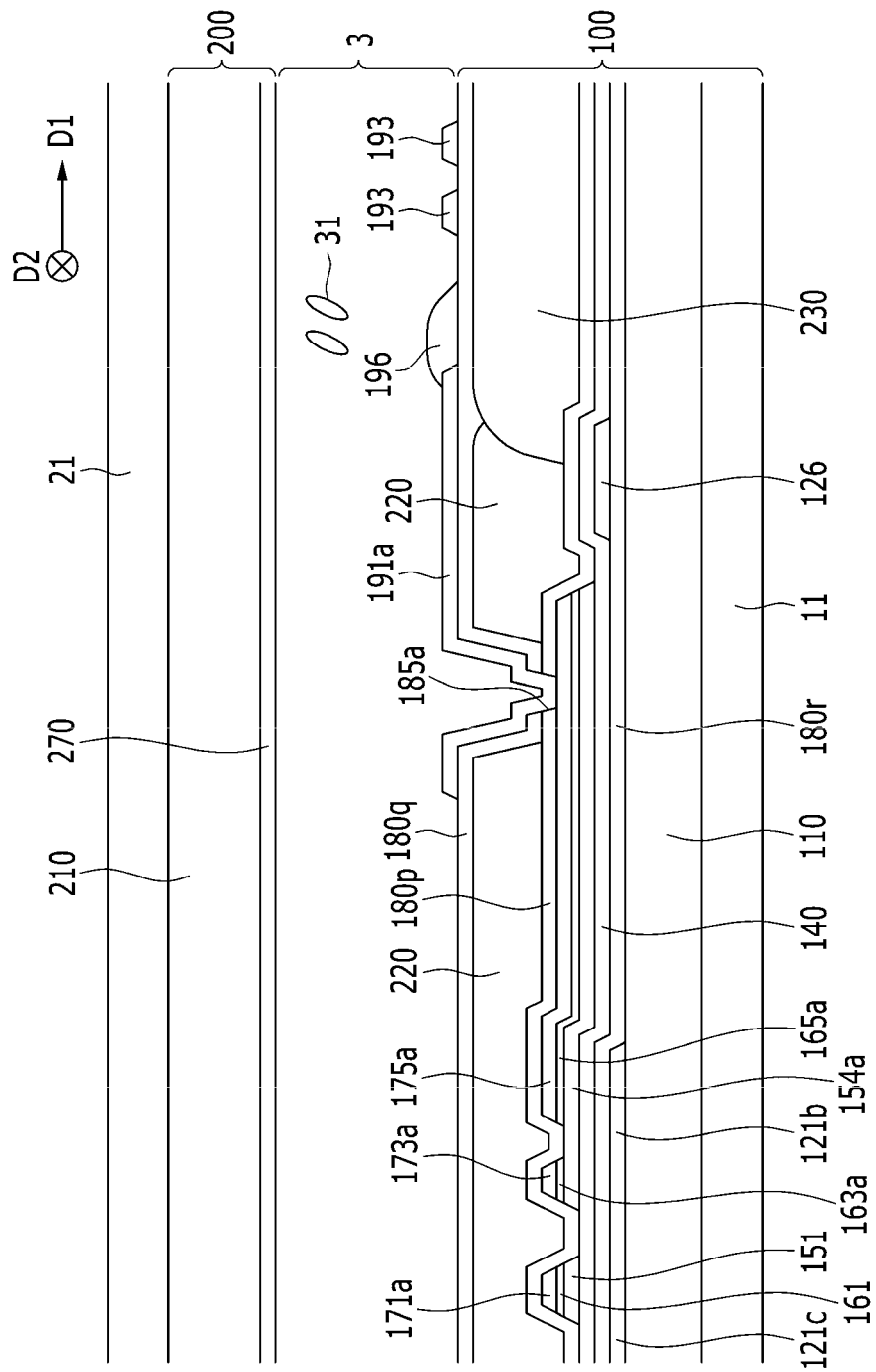
FIG. 7 illustrates a cross-sectional view of a liquid crystal display according to an exemplary embodiment of the present disclosure, taken along line VII-VII of FIG. 5.

FIG. 4 illustrates a circuit diagram of one pixel of a liquid crystal display according to an exemplary embodiment of the present disclosure, and FIG. 5 illustrates a top plan view of one pixel of a liquid crystal display according to an exemplary embodiment of the present disclosure. FIG. 6 illustrates a connection structure of gate lines 121 and data lines 171 of a plurality of pixels of a liquid crystal display according to an exemplary embodiment of the present disclosure, and FIG. 7 illustrates a cross-sectional view of a liquid crystal display according to an exemplary embodiment of the present disclosure, taken along line VII-VII of FIG. 5.

As shown in FIG. 4, a liquid crystal display according to the exemplary embodiment of the present disclosure includes signal lines, including a gate line 121, a step-down gate line 123, and a data line 171, and a pixel PX connected to the signal lines.

Each pixel PX includes first and second subpixels PXa and PXb. The first subpixel PXa includes a first thin film transistor Qa, a first liquid crystal capacitor Clca, and a first storage capacitor Csta, and the second subpixel PXb includes second and third thin film transistors Qb and Qc, a second liquid crystal capacitor Clcb, second storage capacitors Cstb, and a step-down capacitor Cstd.

The first and second thin film transistors Qa and Qb are respectively connected to the gate line 121 and the data line 171, and the third thin film transistor Qc is connected to the step-down gate line 123.

The first and second thin film transistors Qa and Qb are a three-terminal element such as a thin film transistor, the control terminals thereof are connected to the gate line 121, and the input terminals thereof are connected to the data line 171. The output terminal of the first thin film transistor Qa is connected to the first liquid crystal capacitor Clca and the first storage capacitor Csta, and the output terminal of the second thin film transistor Qb is connected to the second liquid crystal capacitor Clcb and the second storage capacitor Cstb.

The third thin film transistor Qc is also a three-terminal element such as a thin film transistor, and the control terminal thereof is connected to the step-down gate line 123, the input terminal thereof is connected to the second thin film transistor Qb to the output terminal of the second thin film transistor Qb, and the output terminal thereof is connected to the step-down capacitor Cstd.

The step-down capacitor Cstd is connected to the output terminal of the third thin film transistor Qc and a common voltage terminal.

Operation of the pixel PX will now be described. First, when a gate-on voltage Von is applied to the gate line 121, the first and second thin film transistors Qa and Qb connected to the gate line 121 are turned on. Accordingly, the data voltage of the data line 171 is applied to the first and second liquid crystal capacitors Clca and Clcb through the turned-on first and second thin film transistors Qa and Qb, and the first and second liquid crystal capacitors Clca and Clcb are charged by a difference between the data voltage Vd and the common voltage Vcom. In this case, a gate-off voltage Voff is applied to the step-down gate line 123.

Next, when the gate-off voltage Voff is applied to the gate line 121 and the gate-on voltage Von is applied to the step-down gate line 123, the first and second thin film transistors Qa and Qb connected to the gate line 121 are turned off, and the third thin film transistor Qc is turned on. Accordingly, a charging voltage of the second liquid crystal capacitor Clcb connected to the output terminal of the second thin film transistor Qb is reduced. As a result, in the liquid crystal display, the charging voltage of the second liquid crystal capacitor Clcb may be lower than that of first liquid crystal capacitor Clca. Accordingly, it is possible to improve side visibility of the liquid crystal display by differentiating the charge voltages of the first and second liquid crystal capacitors Clca and Clcb.

Referring to FIGS. 5 to 7, a liquid crystal display according to the present exemplary embodiment includes a lower panel 100 and an upper panel 200 that face each other, a liquid crystal layer 3 that is interposed between the lower and upper display panels 100 and 200, and a pair of polarizers 11 and 21 that are attached to outer surfaces of the lower and upper display panel 100 and 200.

First, the lower panel 100 will be described.

A first polarizer 11 is formed outside the first substrate 110 formed of transparent glass, plastic, or the like, which is a linear polarizer, and a polarization axis thereof is parallel to the first direction D1. In the present exemplary embodiment, although the first polarizer 11 is formed outside the first substrate 110, the first polarizer 11 may be formed inside the first substrate 110, and it is not limited to being attached to the first substrate 110.

A plurality of gate conductors including the plurality of gate lines 121, the plurality of step-down gate lines 123, and a plurality of storage electrode lines 125 are formed on the first substrate 110. The plurality of gate lines 121 may be disposed on a different layer from where the plurality of step-down gate lines 123 and the plurality of storage electrode lines 125 are disposed on. In this case, an insulating layer 180r may be disposed between the plurality of step-down gate lines 123, the plurality of storage electrode lines 125 and the plurality of gate lines 121.

The gate line 121 and the step-down gate line 123 transmit a gate signal. The gate line 121 includes a first gate portion 121a extending along the right side of the first subpixel electrode 191a, a second gate portion 121b bent from the first gate portion 121a to be connected to the first and second thin film transistors Qa and Qb disposed between the first subpixel electrode 191a and the second subpixel electrode 191b, and a third gate portion 121c bent from the second gate portion 121b and extending along the left side of the second subpixel electrode 191b. The first gate portion 121a is connected to the third gate portion 121c of a pixel which is disposed in one right column and one upper row, and the third gate portion 121c is connected to the first gate portion 121a of a pixel which is disposed in one left column and one lower row.

Since the second subpixel electrode 191b may be removed, if the second subpixel electrode 191b is removed, the third gate portion 121c may be removed, the first gate portion 121a may be connected to the third gate portion 121c of the pixel which is disposed in one right column and one upper row, and the third gate portion 121c may be connected to the first gate portion 121a of the pixel which is disposed in one left column and one lower row.

The gate line 121 includes a first gate electrode 124a and a second gate electrode 124b that protrude vertically, and the step-down gate line 123 includes a third gate electrode 124c that protrudes upwardly. The first gate electrode 124a and the second gate electrode 124b may be connected to each other to form one protrusion portion.

The storage electrode line 125 transmits a predetermined voltage such as the common voltage Vcom. The storage electrode line 125 may include a storage extension portion 126, a pair of vertical portions 128 extending upwardly to be substantially perpendicular to the gate line 121, and a horizontal portion 127 connecting the pair of vertical portions 128, but the structure of the storage electrode line 125 is not limited thereto.

A gate insulating layer 140 is formed on the gate conductors 121, 123, and 125. The gate insulating layer 140 may be made of an organic insulating material, an inorganic insulating material, or the like.

A semiconductor stripe 151 is disposed on the gate insulating layer 140. The semiconductor stripe 151 may extend in a substantially vertical direction and may include first and second semiconductors 154a and 154b that extend toward the first and second gate electrodes 124a and 124b and are connected to each other, and a third semiconductor 154c connected to the second semiconductor 154b.

An ohmic contact stripe 161 may be formed on the semiconductor stripe 151, ohmic contacts 163a and 165a may be formed on the first semiconductor 154a, and the ohmic contact may be formed on each of the second semiconductor 154b and the third semiconductor 154c. However, the ohmic contacts 161 and 165a may be omitted.

Data conductors including the plurality of data lines 171, a plurality of first drain electrodes 175a, a plurality of second drain electrodes 175b, and a plurality of third drain electrodes 175c are formed on the ohmic contacts 161 and 165a.

The data line 171 transmits a data signal and includes a first data portion 171a extending along the left sides of the first and second subpixel electrodes 191a and 191b and a second data portion 171b bent from the first data portion 171a and extending along the lower side of the second subpixel electrode 191b. The second data portion 171b is connected to the first data portion 171a of a pixel which is disposed in one right column and one lower row.

The data line 171 may include a first source electrode 173a and a second source electrode 173b respectively protruding toward the first gate electrode 124a and the second gate electrode 124b. Rod-shaped end portions of the first drain electrode 175a and second drain electrode 175b are partially surrounded by the first source electrode 173a and the second source electrode 173b, respectively. One wide end portion of the second drain electrode 175b extends again to form a third source electrode 173c that is bent in a U-shape. A wide end portion 177c of the third drain electrode 175c overlaps the storage extension portion 126 to form the step-down capacitor Cstd, and the rod-shaped end portion thereof is partially surrounded by the third source electrode 173c.

Since the second subpixel electrode 191b may be removed, if the second subpixel electrode 191b is removed, the first data portion 171a may extend along the left side of the first subpixel electrode 191a, and the second data portion 171b may be bent from the first data portion 171a to extend along the lower side of the first subpixel electrode 191a.

The first, second, and third gate electrodes 124a, 124b, and 124c, the first, second, and third source electrodes 173a, 173b, and 173c, and the first, second, and third drain electrodes 175a, 175b, and 175c, along with the first, second, and third semiconductors 154a, 154b, and 154c form the first, second, and third thin film transistors Qa, Qb, and Qc, respectively.

A lower passivation layer 180p that may be made of an inorganic insulation material such as a silicon nitride or a silicon oxide may be disposed on the data conductors 171, 175a, 175b, and 175c and the exposed semiconductors 154a, 154b, and 154c, and a color filter 230 and a light blocking member 220 may be disposed on the lower passivation layer 180p. At least one of the color filter 230 and the light blocking member 220 may be disposed on the upper panel 200.

Each color filter 230 may express one of three primary colors, such as red, green, and blue, and the color filters 230 may overlap each other on the data line 171.

The light blocking member 220 is referred to as a black matrix, and blocks light not to pass through the black matrix, thereby preventing light leakage. The light blocking member 220 extends vertically along the gate line 121 and the step-down gate lines 123, covers an area in which the first thin film transistor Qa, the second thin film transistor Qb, and the third thin film transistor Qc are disposed, extends along the data line 171, and covers a periphery of the data line 171. An area that is not covered by the light blocking member 220 emits light outside to display an image.

An upper passivation layer 180q is disposed on the color filter 230 and the light blocking member 220. The upper passivation layer 180q prevents the color filter 230 from being lifted, and suppresses contamination of the liquid crystal layer 3 by an organic material such as a solvent diffused from the color filter 230 to the liquid crystal layer 3 to prevent defects such as afterimages that may occur when a screen is driven, and it may be made of an inorganic insulation material such as a silicon nitride or a silicon oxide or an organic material. The upper passivation layer 180q may be omitted if necessary.

A plurality of contact holes 185a and 185b that respectively expose the first drain electrode 175a and the second drain electrode 175b are formed on the lower passivation layer 180p and the upper passivation layer 180q.

The plurality of pixel electrodes 191 are formed on the upper passivation layer 180q. The pixel electrodes 191 are separated from each other by two gate lines 121 and 123 therebetween, are respectively disposed at upper and lower sides of the pixel area, and include the first subpixel electrode 191a and the second subpixel electrode 191b adjacent to each other in a column direction. The first subpixel electrode 191a receives a data voltage from the first drain electrode 175a through the contact hole 185a, and the second subpixel electrode 191b receives a data voltage from the second drain electrode 175b through the contact hole 185b. Shapes of the first subpixel electrode 191a and the second subpixel electrode 191b are the same as those described with reference to FIGS. 1 and 2.

Each of the first subpixel electrode 191a and the second subpixel electrode 191b receives a data voltage from each of the first drain electrode 175a and the second drain electrode 175b. The first subpixel electrode 191a and the second subpixel electrode 191b respectively receiving the data voltage generate an electric field together with a common electrode 270 of the upper panel 200, thereby determining a direction of the liquid crystal molecules 31 in the liquid crystal layer 3 between the two electrodes 191 and 270. As such, luminance of light passing through the liquid crystal layer 3 is changed depending on the determined direction of the liquid crystal molecules 31. The first subpixel electrode 191a and the common electrode 270 form the first liquid crystal capacitor Clca together with the liquid crystal layer 3 interposed therebetween, and the second subpixel electrode 191b and the common electrode 270 form the second liquid crystal capacitor Clcb together with the liquid crystal layer 3 therebetween, thereby maintaining the received voltage even after the first and second thin film transistors Qh and Ql are turned off.

The first and second subpixel electrodes 191a and 191b overlap the storage electrodes 127 and 128 and the storage electrode line 125 to form the first and second storage capacitors Csta and Cstb, and the first and second storage capacitors Csta and Cstb respectively enhance voltage sustaining capabilities of the first and second liquid crystal capacitors Clca and Clcb.

The protrusion portion 196 is formed on an upper portion of the upper passivation layer 180q and a circumference of the pixel electrode 191. The shape and advantages of the protrusion portion 196 are the same as those described with reference to FIGS. 1 and 2.

A lower alignment layer (not shown) is formed on the pixel electrode 191 and the protrusion portion 196. The lower alignment layer may be a vertical alignment layer or an alignment layer including photo-reactive material.

The upper panel 200 will now be described.

A second polarizer 21 is formed outside a second substrate 210 that is made of glass, plastic, and the like, which is a linear polarizer, and a polarization axis thereof is a second direction D2 perpendicular to the polarization axis of the first polarizer 11. In the present exemplary embodiment, although the second polarizer 21 is formed outside the second substrate 210, the second polarizer 21 may be formed inside the second substrate 210, and it is not limited to being attached to the second substrate 210. The first polarization axis and the second polarization axis may be parallel to each other, and may not be parallel to the first or second direction. The second polarizer 21 may be omitted.

The common electrode 270 made of a transparent conductive material is formed on the second substrate 210. The common electrode 270 is formed as a plate electrode which does not have patterns in it. However, the common electrode 270 may have patterns in it.

An upper alignment layer (not shown) is formed on the common electrode 270. The upper alignment layer may be a vertical alignment layer, and may be an alignment layer in which a photo-polymer material is photo-aligned.

The liquid crystal layer 3 disposed between the two display panels 100 and 200 may have a negative dielectric anisotropy, and the liquid crystal molecules 31 of the liquid crystal layer 3 may be aligned so that long axes thereof may be substantially perpendicular to surfaces of the two display panels 100 and 200 in a state in which an electric field is not applied.

As described above, the first subpixel electrode 191a and the second subpixel electrode 191b to which the data voltage is applied generate the electric field together with the common electrode 270 of the upper panel 200, and thus the liquid crystal molecules 31 of the liquid crystal layer 3 aligned to be perpendicular to the surfaces of the two electrode 191 and 270 in the state in which the electric field is not present are tilted in a direction parallel to surfaces of the two electrodes 191 and 270, and luminance of light passing through the liquid crystal layer 3 is changed depending on the tilted level of the liquid crystal molecules 31. In this case, since the luminance of the light depends on the pretilt formed by the protrusion portion 196 and the tilt direction of the liquid crystal molecules 31 is different from the polarization axis (the first direction or the second direction), the luminance of the light passing through the liquid crystal display increases more than when the tilt direction of the liquid crystal molecules 31 is identical to the polarization axis, thereby minimizing loss of transmittance. A unit pixel electrode that is able to be applied to a liquid crystal display according to an exemplary embodiment of the present disclosure will now be described with reference to FIG. 8. Differences compared with the exemplary embodiment of FIG. 2 will mainly be described.

Figure 8:
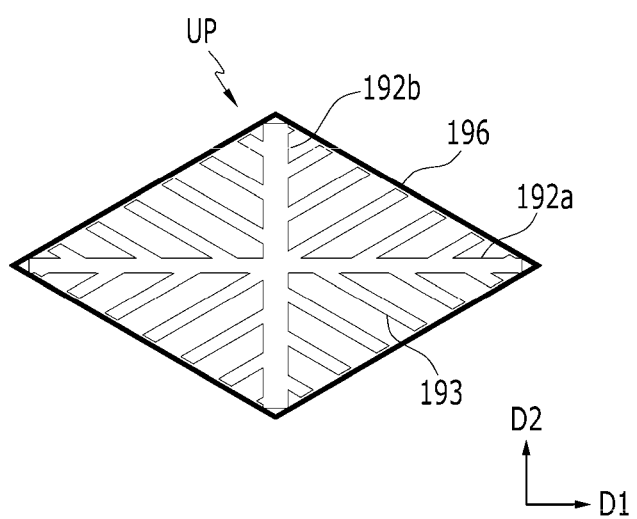
FIG. 8 illustrates a schematic diagram of a unit pixel electrode and a protrusion portion surrounding the unit pixel electrode that are able to be applied to a liquid crystal display according to an exemplary embodiment of the present disclosure.

FIG. 8 illustrates a schematic diagram of a unit pixel electrode UP and a protrusion portion 196 surrounding the unit pixel electrode that are able to be applied to a liquid crystal display according to an exemplary embodiment of the present disclosure.

Referring to FIG. 8, a unit pixel electrode UP forming a pixel electrode includes a pair of horizontal and vertical stems 192a and 192b and a plurality of minute branch electrodes 193 obliquely extending from the stems.

Unlike the exemplary embodiment shown in FIG. 2, the lengths of the horizontal stem 192a and the vertical stem 192b of the current exemplary embodiment may be different from each other, the direction of the horizontal stem 192a is parallel to the first direction D1, and the vertical stem 192b is perpendicular to the horizontal stem 192a. For example, the vertical stem 192b is parallel to the second direction D2.

The protrusion portion 196 is formed on each unit pixel electrode UP, and it is formed in a direction that forms an acute angle with the polarization axis of the area in which the minute branch electrodes 193 of each unit pixel electrode UP are formed in a plane view. For example, the protrusion portion 196 may be formed to surround an area equal to or more than about 80% of an inner area including a center portion of each unit pixel electrode UP. The protrusion portion 196 may be formed in a rhomboid shape that includes the horizontal stem 192a and the vertical stem 192b as two diagonals.

As described in detail with reference to FIGS. 1 to 3, when the protrusion portion 196 is formed at the circumference of the pixel electrode 191 and the liquid crystal molecules are on the protrusion portion 196, the liquid crystal molecules have the pretilt in a direction perpendicular to a surface of the protrusion portion 196. Since the direction in which the protrusion portion 196 of FIG. 8 is formed is different from that of the polarization axis (the first direction or the second direction) and the tilt direction of the liquid crystal molecules is not identical to the polarization axis, luminance of light passing through the liquid crystal display increases more than when the tilt direction of the liquid crystal molecules 31 is identical to the polarization axis, thereby minimizing loss of transmittance.

Various pixel electrodes that are able to be applied to a liquid crystal display according to an exemplary embodiment of the present disclosure will now be described with reference to FIGS. 9 to 11.

Figure 9:
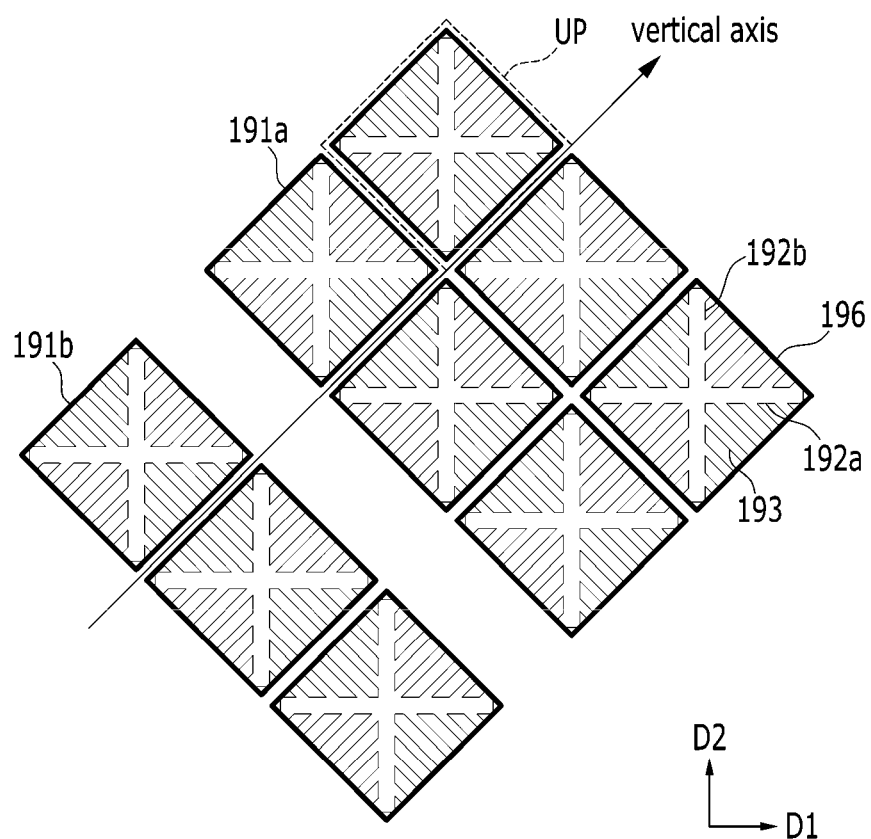
FIGS. 9, 10 and 11 illustrate schematic diagrams of a pixel electrode and a protrusion portion surrounding the pixel electrode that are able to be applied to a liquid crystal display according to an exemplary embodiment of the present disclosure.
Figure 10:
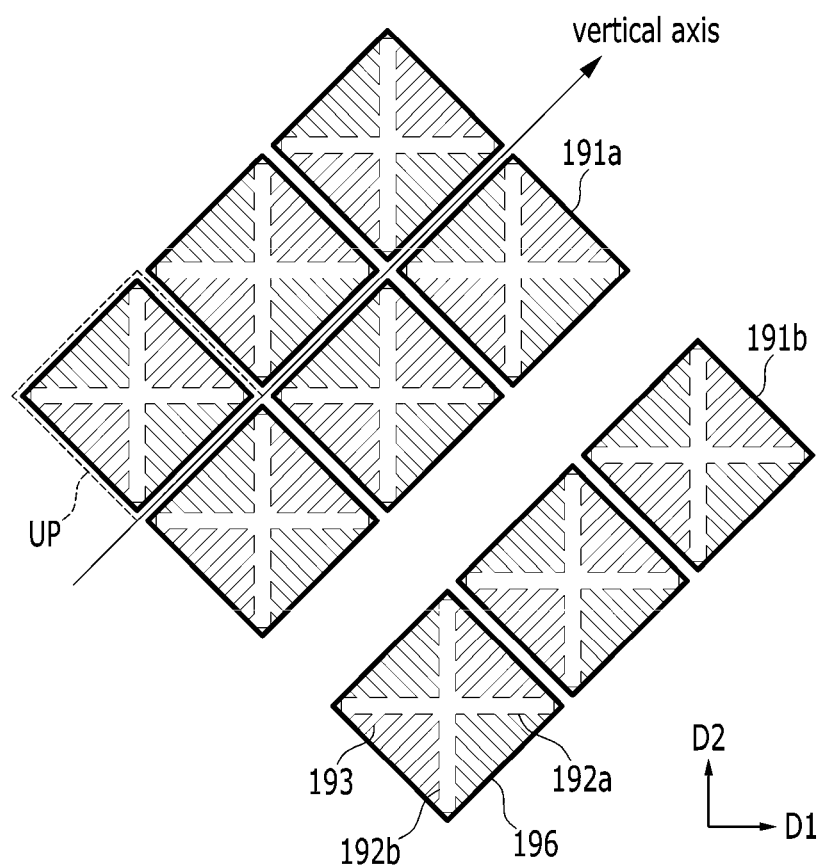
Figure 11:
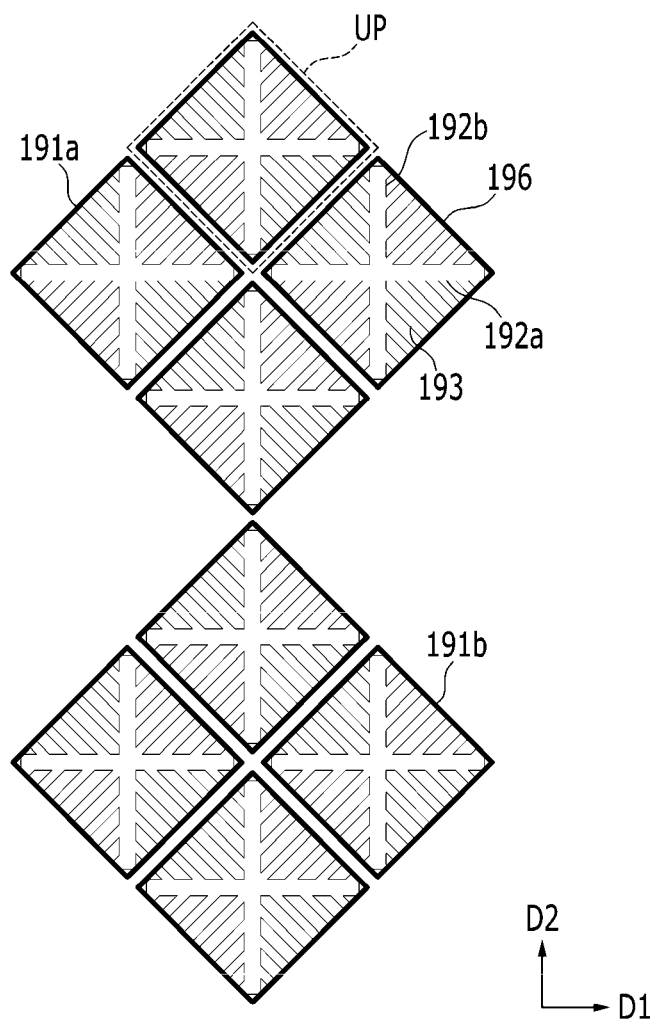

FIGS. 9 to 11 illustrate schematic diagrams of a pixel electrode and a protrusion portion surrounding the pixel electrode that are able to be applied to a liquid crystal display according to an exemplary embodiment of the present disclosure.

A liquid crystal display according to an exemplary embodiment of the present disclosure may include a plurality of pixel electrodes 191, and each pixel electrode 191 includes a first subpixel electrode 191a and a second subpixel electrode 191b. The pixel electrode 191 is formed to include a plurality of unit pixel electrodes UP.

In the exemplary embodiment of FIG. 9, the first subpixel electrode 191a consists of six unit pixel electrodes UP, and the second subpixel electrode 191b consists of three unit pixel electrodes UP. When the horizontal direction of the liquid crystal display and the polarization axis direction of the polarizer formed in the liquid crystal display are referred to as the first direction D1, the overall vertical axis of the pixel electrode 191 is obliquely formed compared to the first direction D1 and may form an angle of about 45° to the left side based on the first direction D1.

In the exemplary embodiment of FIG. 10, the first subpixel electrode 191a consists of six unit pixel electrodes UP, the second subpixel electrode 191b consists of three unit pixel electrodes UP, and when the horizontal direction of the liquid crystal display and the polarization axis direction of the polarizer formed in the liquid crystal display are referred to as the first direction D1, the overall vertical axis of the pixel electrode 191 is obliquely formed compared to the first direction D1 and may form an angle of about 45° to the left side based on the first direction D1.

In the exemplary embodiment of FIG. 11, the first subpixel electrode 191a consists of four unit pixel electrodes UP, and the second subpixel electrode 191b consists of four unit pixel electrodes UP. The first and second subpixel electrodes 191a and 191b wholly form a rhomboid shape.

In the exemplary embodiments of FIGS. 9 to 11, the direction in which the protrusion portion 196 is formed is different from that of the polarization axis (the first direction or the second direction), and the tilt direction of the liquid crystal molecules is not identical to the polarization axis. Accordingly, luminance of light passing through the liquid crystal display increases more than when the tilt direction of the liquid crystal molecules 31 is identical to the polarization axis, thereby minimizing loss of transmittance.

While this disclosure has been described in connection with what is presently considered to be practical exemplary embodiments, it is to be understood that the disclosure is not limited to the disclosed embodiments, and it is possible to variously design the liquid crystal display in a condition that the direction in which the protrusion portion 196 is formed is not identical to the polarization axis (the first direction or the second direction).

An exemplary embodiment in which the exemplary embodiment of the present disclosure is applied to a curved liquid crystal display will now be described with reference to FIG. 12.

Figure 12:
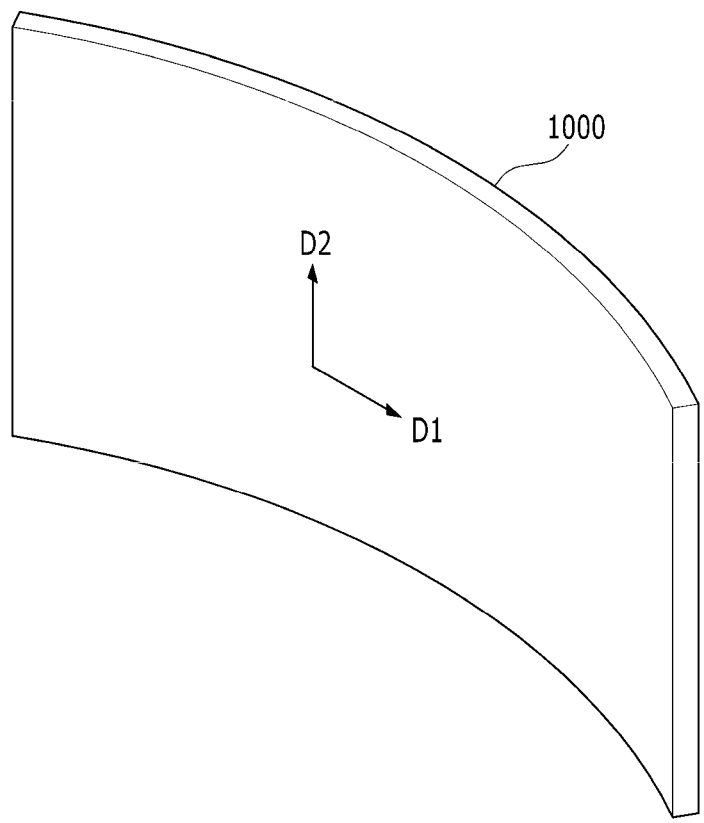
FIG. 12 illustrates a perspective view of a curved liquid crystal display according to an exemplary embodiment of the present disclosure.

FIG. 12 illustrates a perspective view of a liquid crystal display according to an exemplary embodiment of the present disclosure.

As shown in FIG. 12, a curved liquid crystal display 1000 according to an exemplary embodiment of the present disclosure is formed to be bent with a predetermined curvature. The curved liquid crystal display 1000 is bent in the first direction D1. The curved liquid crystal display 1000 according to the exemplary embodiment of the present disclosure is formed by manufacturing a flat liquid crystal display and then bending the same.

Regarding the flat liquid crystal display, the distance from the viewer's eye to a plurality of pixels included in the flat liquid display device varies. For example, the distance from the viewer's eye to pixels on the left and right edges of a flat display device may be longer than the distance from the viewer's eye to pixels at the center of the flat-panel display device. On the contrary, in the curved liquid crystal display 1000 according to an exemplary embodiment of the present disclosure, the distance from the viewer's eye to a plurality of pixels is nearly constant, provided that the viewer's eye is at the center of a circle formed by extending the curve. Since such a curved liquid crystal display provides a wider viewing angle than flat-panel display devices, photoreceptor cells are stimulated by more information, sending more visual information to the brain through optic nerves. Accordingly, the sense of reality and immersion may be heightened.

When embodiments of the present disclosure are applied to a curved display device, since a groove, a protrusion, or the like is not formed in the common electrode, it is possible to prevent transmittance from deteriorating due to misalignment of between two display panels.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a first polarizer disposed below the first substrate and having a first polarization axis;
   a gate line and a data line disposed above the first substrate;
   a first transistor connected to the gate line and the data line;
   a second transistor connected to the gate line and the data line;
   a passivation layer disposed on the first transistor and the second transistor;
   a pixel electrode disposed on the passivation layer and including a first subpixel electrode and a second subpixel electrode separated from each other, wherein the first subpixel electrode is connected to the first transistor, the second subpixel electrode is connected to the second transistor, and the first subpixel electrode and the second subpixel electrode include a plurality of unit pixel electrodes, each unit pixel electrode including a horizontal stem and a vertical stem crossing each other, and a plurality of minute branch electrodes extending from the stems;
   a protrusion portion disposed on the passivation layer, overlapping an edge of the each unit pixel electrode and a connecting portion of adjacent unit pixel electrodes, and extending in a direction that forms an acute angle with the first polarization axis; and
   a liquid crystal layer formed on the first substrate and including liquid crystal molecules,
   wherein the gate line includes a first gate portion extending along a right side of the first subpixel electrode and a second gate portion bent from the first gate portion, extending substantially perpendicular to the first gate portion, and connected to the first transistor and the second transistor,
   the data line includes a first data portion extending along a left side of the first subpixel electrode and the second subpixel electrode and a second data portion bent from the first data portion, extending substantially perpendicular to the first data portion, and extending along a lower side of the second subpixel electrode and
   the second gate portion is disposed between the first subpixel electrode and the second subpixel electrode.

2. The liquid crystal display of claim 1, wherein the protrusion portion surrounds equal to or more than about 80% of an inner area including a center portion of the each unit pixel electrode in a plane view, and
   wherein the protrusion portion does not overlap the center portion of the each unit pixel electrode.

3. The liquid crystal display of claim 2, wherein
   the protrusion portion is formed in a rhomboid shape that includes the horizontal stem and the vertical stem as two diagonals.

4. The liquid crystal display of claim 3, wherein
   the liquid crystal molecules on the protrusion portion have a pretilt in a direction perpendicular to a surface of the protrusion portion.

5. The liquid crystal display of claim 4, wherein
   the direction of the pretilt of the liquid crystal molecules is parallel to a direction in which the minute branch electrodes extend.

6. The liquid crystal display of claim 5, further comprising a common electrode formed in a plate shape.

7. The liquid crystal display of claim 6, wherein
   the protrusion portion includes an organic material.

8. The liquid crystal display of claim 7, wherein
   the first gate portion is connected to the second gate portion of a pixel which is disposed in one right column and one upper row, and
   the second data portion is connected to the first data portion of a pixel which is disposed in one right column and one lower row.

9. The liquid crystal display of claim 8, wherein
   the liquid crystal display is bent along a first direction to have a predetermined curvature to form a curved display.

10. The liquid crystal display of claim 5, wherein
    the horizontal stem is formed in a first direction, and
    the vertical stem is formed in a direction perpendicular to the horizontal stem.

11. The liquid crystal display of claim 10, wherein
    the protrusion portion is formed at an angle of about 45° with respect to the first direction, and
    the protrusion portion is a square.

12. The liquid crystal display of claim 11, further comprising
    a second substrate facing the first substrate; and
    a second polarizer formed above or below the second substrate and having a second polarization axis,
    wherein the first polarization axis is parallel or perpendicular to the first direction, and
    the second polarization axis is parallel or perpendicular to the first polarization axis.

13. The liquid crystal display of claim 12, further comprising
    a common electrode formed on one side of the second substrate in a plate shape.

14. The liquid crystal display of claim 13, wherein the protrusion portion is formed to include an organic material.

\* \* \* \* \*